No. 789,661. PATENTED MAY 9, 1905.
T. P. KEATING.
LATHE CENTER.
APPLICATION FILED SEPT. 25, 1903.

WITNESSES:
Rob't C. Chapman
Helen Oxford

INVENTOR:
Thomas P. Keating,
by Albert G. Davis
Atty.

No. 789,661.                                          Patented May 9, 1905.

UNITED STATES PATENT OFFICE.

THOMAS P. KEATING, OF SCHENECTADY, NEW YORK.

LATHE-CENTER.

SPECIFICATION forming part of Letters Patent No. 789,661, dated May 9, 1905.

Application filed September 25, 1903. Serial No. 174,533.

*To all whom it may concern:*

Be it known that I, THOMAS P. KEATING, a citizen of the United States, residing at Schenectady, in the county of Schenectady, State of New York, have invented certain new and useful Improvements in Lathe-Centers, of which the following is a specification.

This invention relates to lathes, and especially to those used for turning heavy shafting, such as the shafts of dynamo-electric machines; but it is also applicable to any high-speed lathe—such, for instance, as a polishing-lathe. In the shafting-lathe the high speed, together with the heavy cut, produces an excessive friction between the shaft and the tail-stock center. Such excessive-friction is also liable to occur in the polishing-lathe by reason of the high speed and the expansion of the work due to the heating effect of the polishing materials. This friction frequently causes the work to stick to the center and twist it off, and inasmuch as the consequences of such an accident are apt to be quite serious the object of my invention is to provide a tail-stock center which will prevent all possibility of the shaft sticking thereto.

To this end the invention consists in a tail-stock center comprising two concentric members, the inner member, which supports the work, being rotatable in the outer member. The construction is such that a certain amount of friction can be maintained between the two members slightly in excess of that which normally exists between the rotating work and the supporting member of the center. Under ordinary conditions this member will remain stationary; but if for any reason the friction between the work and said member becomes excessive said member can rotate, and thus obviate all danger of its breaking off.

Figure 1:
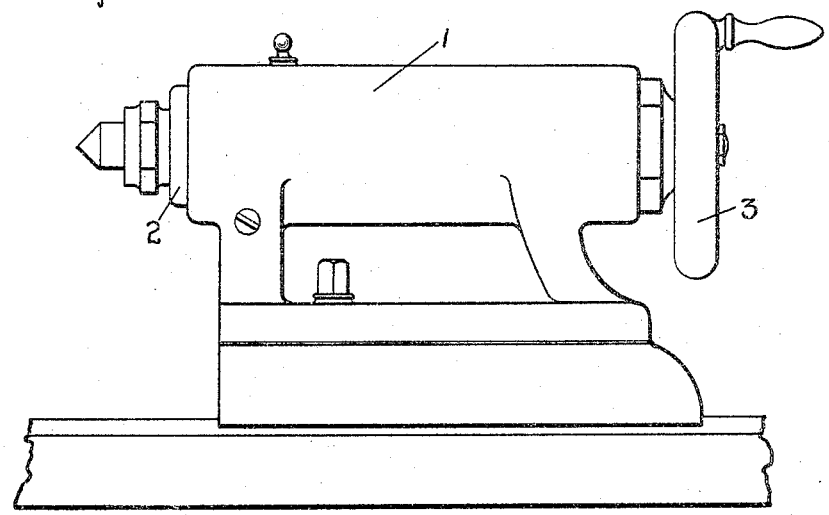
Figure 2:
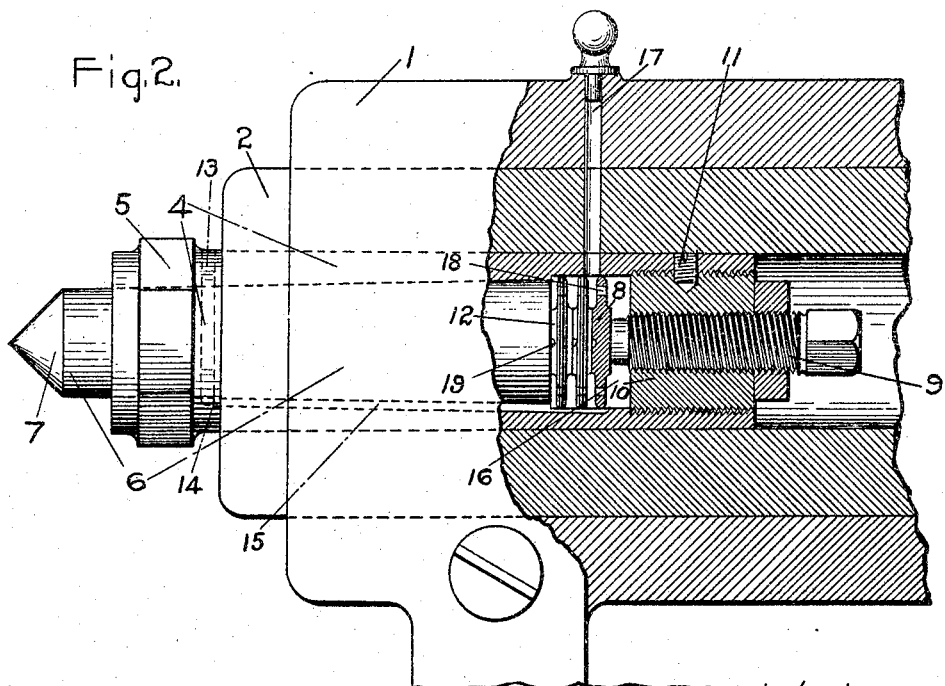

In the accompanying drawings, Figure 1 is a side elevation of the tail-stock of a lathe equipped with my improved center, and Fig. 2 is a longitudinal section of the working parts of said center.

The tail-stock 1 is provided with the usual spindle 2, which can be reciprocated in the customary manner by means of the hand-wheel 3. In the spindle is a tapering socket in which is received the outer member 4 of my improved center. This member has a tapering exterior to fit into the socket of the spindle, beyond which it projects a certain distance, the projecting portion being provided with a polygonal collar 5 to receive a wrench for removing said member when it becomes necessary. The member 4 is tubular, its interior being tapered in the reverse direction to its external surface—that is to say, with the small end of the tapered portion at the outer end of the member 4. Fitted into this tapered bore of the member 4 is the inner rotatable member 6 of the center, which has a tapered body projecting beyond the end of the member 4 and provided with the usual conical end or tip 7 for receiving and supporting the end of the rotating work. The inner member 6 is not so long as the outer member 4, and in the space beyond its larger end there are preferably several antifriction-disks 8, which intervene between the end of the member 6 and a pressure-screw 9, working in a threaded bushing 10, inserted into the inner end of the outer member 4 and secured therein in any suitable manner, such as by means of the set-screw 11. The disks 8 have central hubs 12, which space the disks apart, and the edges of the disks are preferably thinned down to a narrow edge, as shown, in order to reduce the friction between them and the cylindrical wall of the chamber in which they are inclosed. The disks are preferably made of bronze and steel alternated—that is to say, the member 6 of the center being of steel, the disk next to it will be of bronze, the next disk of steel, and the one between that and the end of the steel pressure-screw will be of bronze. In order to keep the disks and the rotatable member of the center well lubricated, an oil-hole 13 is provided in the projecting end of the outer member 4, said hole communicating with an annular groove 14, surrounding the rotatable member 6 near its outer end. From this groove a channel 15 runs along the lower side of the interior of the outer member 4 and communicates with the chamber 16, in which the disks are located. An oil-hole 17 enters said chamber through the wall of the outer member 4 in order that the chamber may be filled with oil after the center is inserted in the tail-stock. The disks have perforations 18 through them, and their hubs have transverse grooves 19 to facilitate the distribution of oil.

The operation of my device is as follows: The pressure-screw 9 is tightened up until the friction between the rotatable member 6 and the stationary member 4 is slightly greater than the normal friction between the rotating work and the conical tip 7 of the rotatable member 6 of the center. So long as these conditions exist the rotatable member 6 will remain stationary; but in case the friction on the tip 7 becomes so great that there is danger of the center being twisted off the friction between the inner rotatable member and the outer member will be overcome, and the inner member 6 will rotate with the work. It follows that when the lathe is in operation the inner member 6 will be alternately at rest and in rotation for periods of time, depending upon the varying friction between the rotating work and the conical tip of the center.

I do not desire to restrict myself to the particular form or arrangement of parts herein described and shown, since it is apparent that they may be changed and modified without departing from my invention.

What I claim as new, and desire to secure by Letters Patent of the United States, is—

1. A tail-stock center comprising two concentric members, the inner one being rotatable, and an axially-arranged pressure-screw for regulating the friction between said members.

2. A tail-stock center comprising two concentric members fitting together on a taper, the smaller end of the inner member being adjacent to its work-supporting tip, and means to axially adjust said members to vary the friction between them.

3. A tail-stock center comprising two concentric members, a pressure-screw for axially adjusting one member relatively to the other and regulating the friction between them, and antifriction-disks between the inner member and said pressure-screw.

4. A tail-stock center comprising two concentric members, a pressure-screw for adjusting the axial relation of said members, and antifriction-disks interposed between said screw and the inner member of said center.

5. A tail-stock center comprising two concentric members, a pressure-screw for regulating the friction between them, and antifriction-disks between the inner member and said pressure-screw, said disks having grooves and perforations for the passage of oil.

6. A tail-stock center comprising an outer member, a threaded bushing in its inner end, a pressure-screw working in said bushing, a shorter, rotatable, tapered inner member, and antifriction-disks between said member and the pressure-screw.

7. A tail-stock center comprising an outer member, a threaded bushing in its inner end, a pressure-screw working in said bushing, a shorter, rotatable tapered inner member, antifriction-disks between said member and the pressure-screw, and oil-passages in said outer member leading into the chamber containing said disks.

In witness whereof I have hereunto set my hand this 22d day of September, 1903.

THOMAS P. KEATING.

Witnesses:
HELEN ORFORD,
G. C. HOLLISTER.